United States Patent
Luo

(10) Patent No.: US 8,476,521 B2
(45) Date of Patent: *Jul. 2, 2013

(54) SOLAR GENERATOR APPARATUS WITH ELASTICALLY CABLE-CONTROLLED TRACKING

(75) Inventor: Chia Ching Luo, Hsinchu County (TW)

(73) Assignees: Topper Sun Energy Technology Co., Ltd., Hsinchu County (TW); Chia-Ching Luo, Hsinchu County (TW)

( * ) Notice: Subject to any disclaimer, the term of this patent is extended or adjusted under 35 U.S.C. 154(b) by 139 days.

This patent is subject to a terminal disclaimer.

(21) Appl. No.: 13/234,752

(22) Filed: Sep. 16, 2011

(65) Prior Publication Data

US 2013/0068280 A1 Mar. 21, 2013

(51) Int. Cl.
*H01L 31/042* (2006.01)

(52) U.S. Cl.
USPC .......................................... 136/246

(58) Field of Classification Search
USPC ................................... 136/246; 248/237, 52
See application file for complete search history.

(56) References Cited

U.S. PATENT DOCUMENTS

| 6,465,725 | B1 * | 10/2002 | Shibata et al. | 136/246 |
| 2008/0011288 | A1 * | 1/2008 | Olsson | 126/576 |
| 2009/0107542 | A1 * | 4/2009 | Bender | 136/246 |

* cited by examiner

*Primary Examiner* — Miriam Berdichevsky
*Assistant Examiner* — Niki Bakhtiari
(74) *Attorney, Agent, or Firm* — Muncy, Geissler, Olds & Lowe, PLLC

(57) ABSTRACT

A solar generator apparatus includes a generator module having first to fourth corner portions; a middle column; first and second winding devices attached to the middle column; first and second cables and first to fourth elastic anchors. The middle column has first and second ends, mounted on a fixed structure and pivotally connected to the generator module, respectively. The first cable, having two ends respectively connected to the first and third corner portions, is wound around the first winding device. The second cable, having two ends respectively connected to two ends of the second and fourth corner portions, is wound around the second winding device. The first to fourth elastic anchors are elastically mounted on the fixed structure. The first cable passes through the first and third elastic anchors to form a W-shaped structure. The second cable passes through the second and fourth elastic anchors to form another W-shaped structure.

10 Claims, 7 Drawing Sheets

SOLAR GENERATOR APPARATUS WITH ELASTICALLY CABLE-CONTROLLED TRACKING

BACKGROUND OF THE INVENTION

1. Field of the Invention

The invention relates in general to a solar generator apparatus with elastically cable-controlled tracking, and more particularly to a solar generator apparatus using a middle column and cables to control the sun-tracking function of a solar generator module.

2. Related Art

Usually, a solar generator system is mounted on a building or in a fixed manner, and cannot be adjusted according to the azimuth angle of the sun, so that the received availability of the solar energy is limited. Alternatively, a wind-solar hybrid generator system has a cylinder for supporting a wind power generator, and a solar generator module, which is usually very small and is mounted on the cylinder. Because the middle portion of the solar generator module is directly and slantingly fixed to the cylinder, the solar generator module may be damaged by the strong wind if its area is too large. This is because the structural strength of connection between the cylinder and the solar generator module is insufficient to withstand the strong wind. Alternatively, when an external force is suddenly applied to the solar generator module, the solar generator module tends to be damaged due to the too high rigidity of the solar generator module. Thus, the conventional solar generator system still has to be improved.

SUMMARY OF THE INVENTION

It is therefore an object of the invention to provide a solar generator apparatus for controlling a tracking function of a solar generator module using a middle column and cables to achieve the stable and elastic support.

To achieve the above-identified object, the invention provides a solar generator apparatus, which has elastically cable-controlled tracking and is mounted on a fixed structure. The solar generator apparatus includes a solar generator module, a middle column, first and second winding devices, a first cable, a second cable and first to fourth elastic anchors. The solar generator module converts light into electricity and has first to fourth corner portions. The middle column has a first end mounted on the fixed structure and a second end pivotally connected to a middle portion of a bottom of the solar generator module, and rotatably supports the solar generator module. The first and second winding devices are attached to the middle column. The first cable has a first end connected to the first corner portion and a second end connected to the third corner portion, and is wound around the first winding device. The second cable has a first end connected to the second corner portion and a second end connected to the fourth corner portion, and is wound around the second winding device. An angle of the solar generator module is adjusted by rotating one or both of the first winding device and the second winding device. The first to fourth elastic anchors are fixed to the fixed structure and respectively correspond to the first to fourth corner portions. The first cable penetrates through the first and third elastic anchors to form a W-shaped structure, and the second cable penetrates through the second and fourth elastic anchors to form another W-shaped structure.

Accordingly, the solar generator apparatus with elastically cable-controlled tracking according to the invention can have the stable and elastic support and sun-tracking effects, is thus suitable for the large generator application, can be rotated and moved with multiple degrees of freedom to track the sun, and can be adapted to various applications to effectively enhance the received availability of the solar energy.

Further scope of the applicability of the present invention will become apparent from the detailed description given hereinafter. However, it should be understood that the detailed description and specific examples, while indicating preferred embodiments of the present invention, are given by way of illustration only, since various changes and modifications within the spirit and scope of the present invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention.

DETAILED DESCRIPTION OF THE INVENTION

The present invention will be apparent from the following detailed description, which proceeds with reference to the accompanying drawings, wherein the same references relate to the same elements.

The following term "connection" includes, without limitation to, direct connection or indirect connection.

Figure 1:
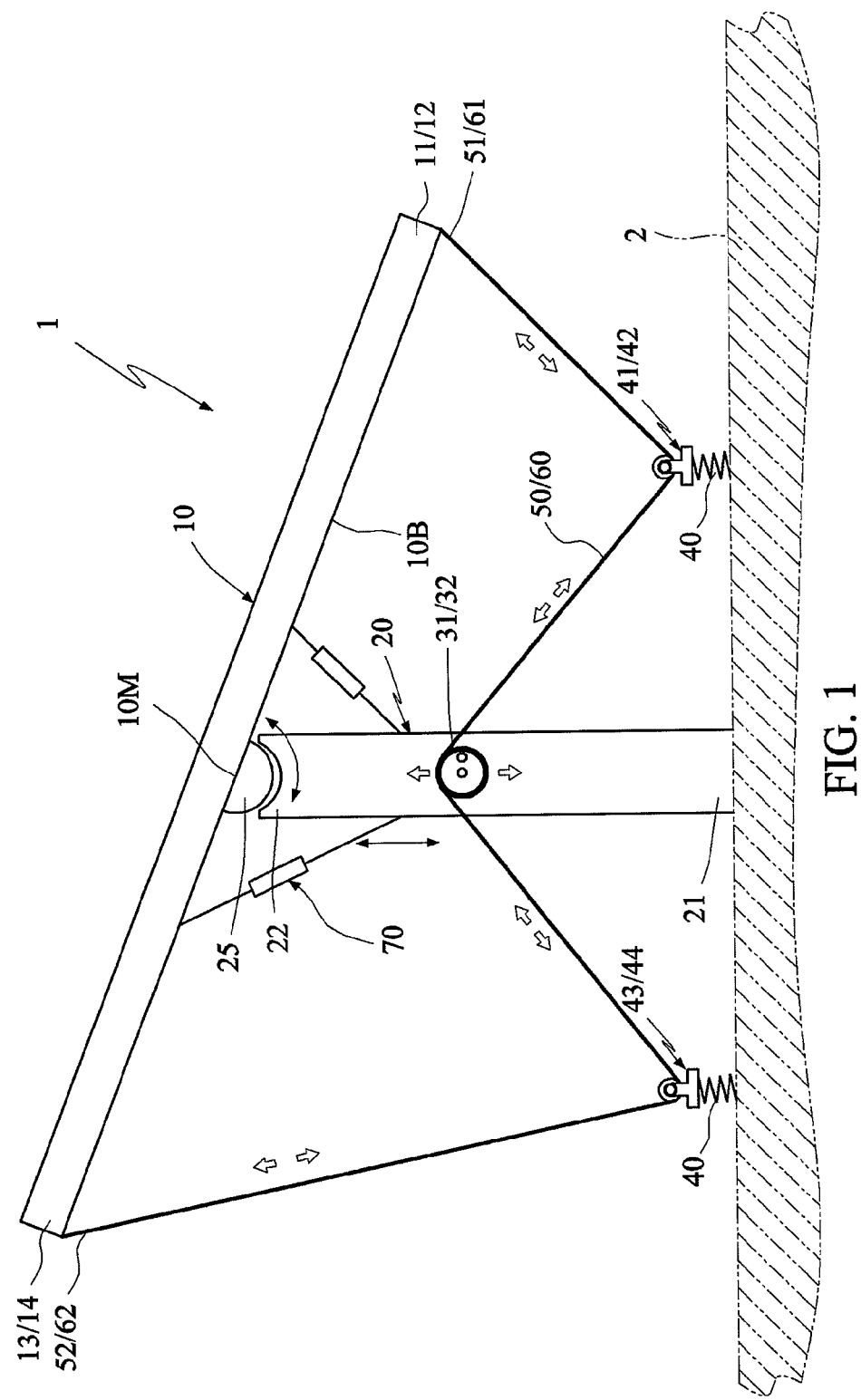
FIGS. 1 and 2 are schematic illustrations showing two states of a solar generator apparatus according to a preferred embodiment of the invention.
Figure 2:
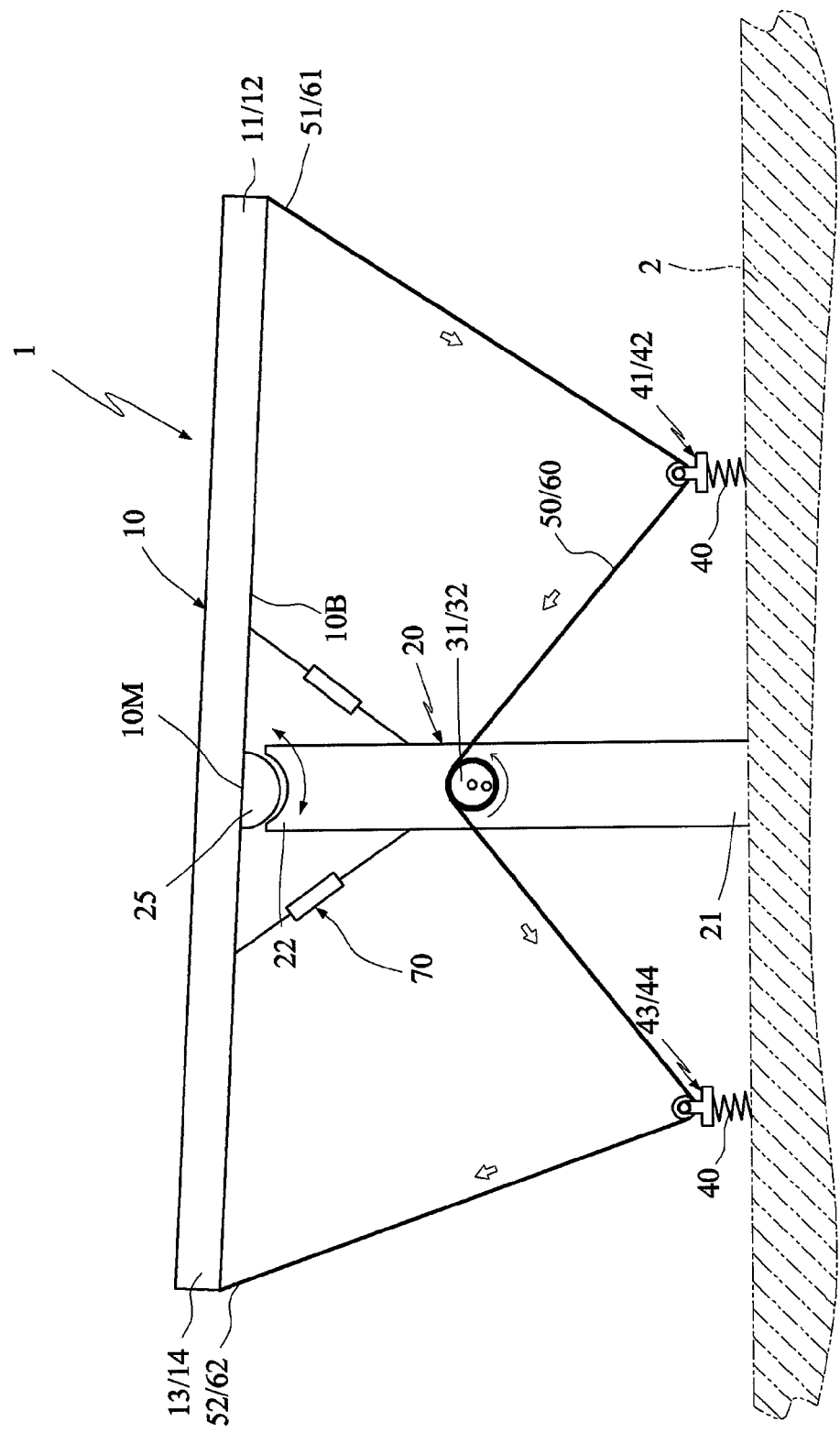
Figure 3:
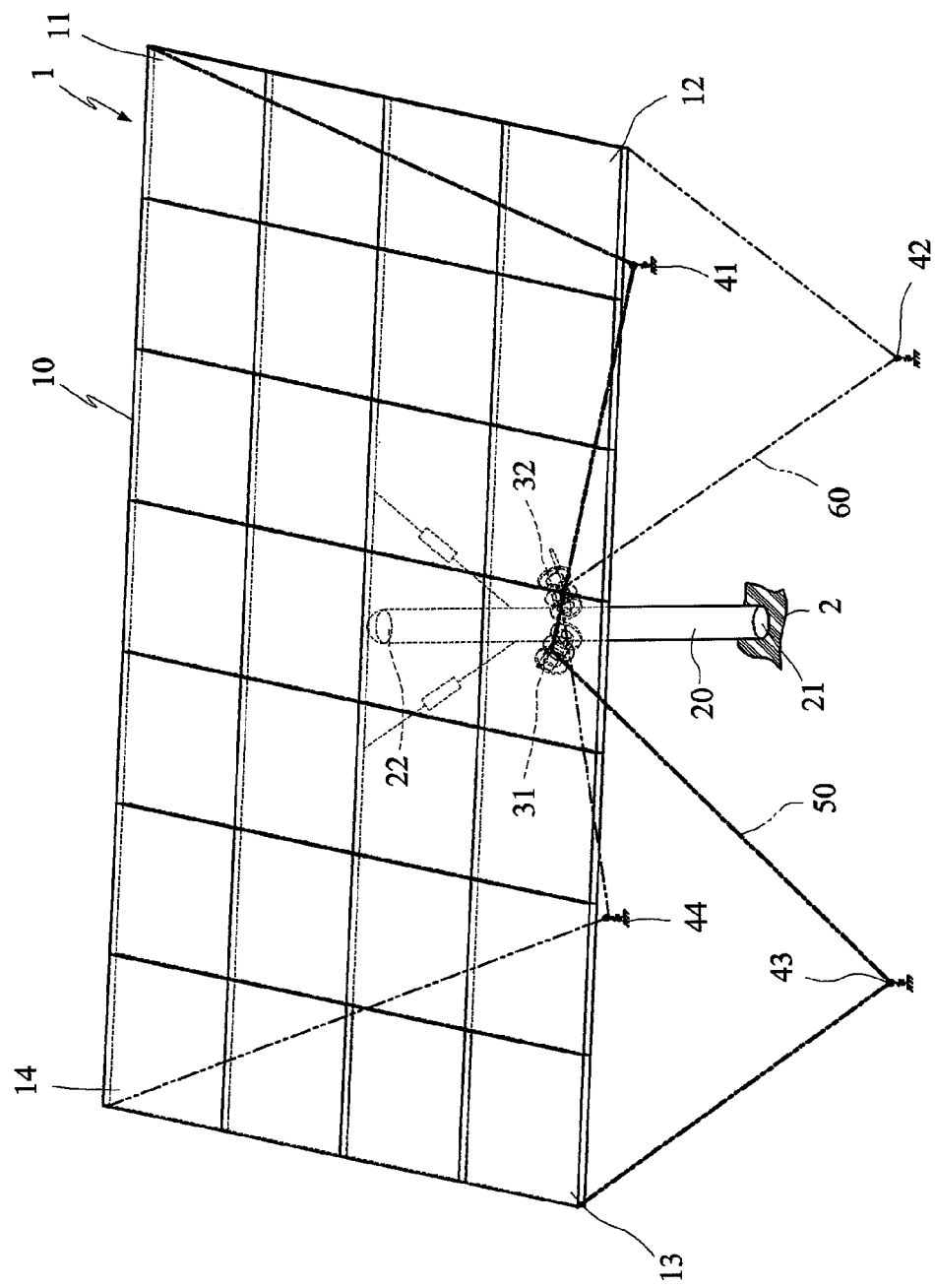
FIG. 3 a pictorial view showing the solar generator apparatus according to the preferred embodiment of the invention.

FIGS. 1 and 2 are schematic illustrations showing two states of a solar generator apparatus 1 according to a preferred embodiment of the invention. FIG. 3 a pictorial view showing the solar generator apparatus 1 according to the preferred embodiment of the invention. Referring to FIGS. 1 to 3, the solar generator apparatus 1 with elastically cable-controlled tracking according to the preferred embodiment of the invention is mounted on a fixed structure 2, and includes a solar generator module 10, a middle column 20, first and second winding devices 31, 32, a first cable 50, a second cable 60 and first to fourth elastic anchors 41 to 44. It is to be noted that the first and second winding devices 31 and 32 in FIGS. 1 and 2 are depicted in the simplified manner so as not to cloud the features of the invention.

The solar generator module 10 converts light into electricity, and has first to fourth corner portions 11 to 14. The first to fourth corner portions 11 to 14 need not to be four corners of the solar generator module 10, and may be the portions near the four corners thereof.

The middle column 20 for rotatably supporting the solar generator module 10 has a first end 21 mounted on the fixed structure 2, and a second end 22 pivotally connected to a middle portion 10M of a bottom 10B of the solar generator module 10. The middle portion 10M is preferably located at or near a center of gravity of the solar generator module 10. However, the invention is not particularly restricted thereto. The second end 22 of the middle column 20 is pivotally connected to the middle portion 10M of the bottom 10B of the solar generator module 10 through a universal joint 25. The universal joint 25 includes a ball and a spherical concave portion working in conjunction with the ball, and is well known in the art, so detailed descriptions thereof will be omitted. As a result, the solar generator module 10 may be rotated freely about the universal joint 25, and the user can easily adjust the arrangement or position angle of the solar generator module 10 to track the sun. The middle column 20 is retractable in length, but may also have the fixed length. Rotating the first/second winding device 31/32 can change the lengths of the portions of the first/second cable 50/60 on two sides of the first/second winding device 31/32, and thus change the angle of the solar generator module 10.

The first and second winding devices 31, 32 are attached to the middle column 20. It is to be noted that the first and second winding devices 31, 32 are movably disposed on or in the middle column 20 so that the levels of the first and second winding devices 31, 32 can be adjusted by the mechanism, including a pinion and a rack working in conjunction with each other, a nut and a screw rod working in conjunction with each other, or the like. Because the mechanism is well known in the art, detailed descriptions thereof will be omitted. The first and second winding devices 31, 32 may be manual or electrical winding devices. The first and second winding devices 31, 32 may be accommodated within the middle column 20 or disposed on the external surface of the middle column 20 without any restrictive purpose.

The first cable 50 has a first end 51 connected to the first corner portion 11 and a second end 52 connected to the third corner portion 13. The first cable 50 is wound around the first winding device 31.

The second cable 60 has a first end 61 connected to the second corner portion 12 and a second end 62 connected to the fourth corner portion 14. The second cable 60 is wound around the second winding device 32. The position angle of the solar generator module 10 may be adjusted by rotating one or both of the first winding device 31 and the second winding device 32 to achieve the elastic sun-tracking effect and increase the power generation efficiency.

Each of first to fourth elastic anchors 41 to 44 includes a spring 40. The first to fourth elastic anchors 41 to 44 are elastically mounted on the fixed structure 2, and respectively correspond to the first to fourth corner portions 11 to 14. The first cable 50 passes through the first and third elastic anchors 41 and 43 to form a W-shaped structure. Thus, the first cable 50 sequentially passes through the first elastic anchor 41, the first winding device 31 and the third elastic anchor 43 from the first end 51 to the second end 52. The second cable 60 passes through the second and fourth elastic anchors 42 and 44 to form another W-shaped structure. Rotating the first/second winding device 31/32 can change the lengths of the portions of the first/second cable 50/60 on two sides of the first/second winding device 31/32, and thus change the angle of the solar generator module 10. Thus, the second cable 60 sequentially passes through the second elastic anchor 42, the second winding device 32 and the fourth elastic anchor 44 from the first end 61 to the second end 62. The two W structures can make the overall structure of the solar generator apparatus 1 become stabler, and the solar generator apparatus 1 cannot be easily damaged by the external force, caused by the strong wind or earthquakes.

In addition, the solar generator apparatus 1 may further include multiple buffer assemblies 70, which can retractably connect the middle column 20 to the solar generator module 10 to assist in supporting and buffering the solar generator module 10, to which the external force is applied. The buffer assembly 70 includes, for example, an oil cylinder, a pneumatic cylinder or any other assembly which can provide the effect of buffering the large external force, applied to or exerted on the solar generator module 10, so that the damage can be reduced.

Figure 4:
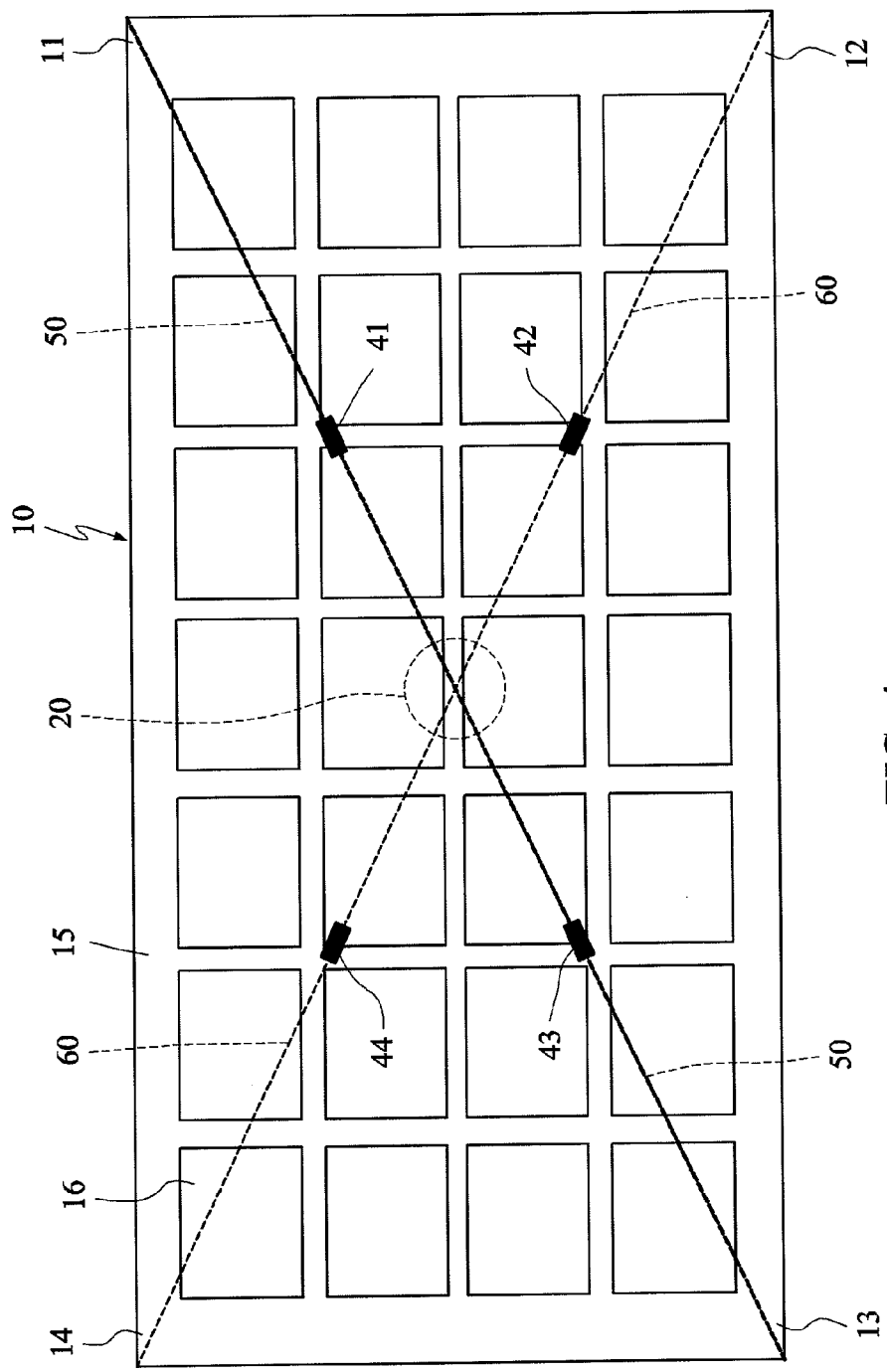
FIGS. 4 and 5 are top views showing two examples of the solar generator module according to the preferred embodiment of the invention.
Figure 5:
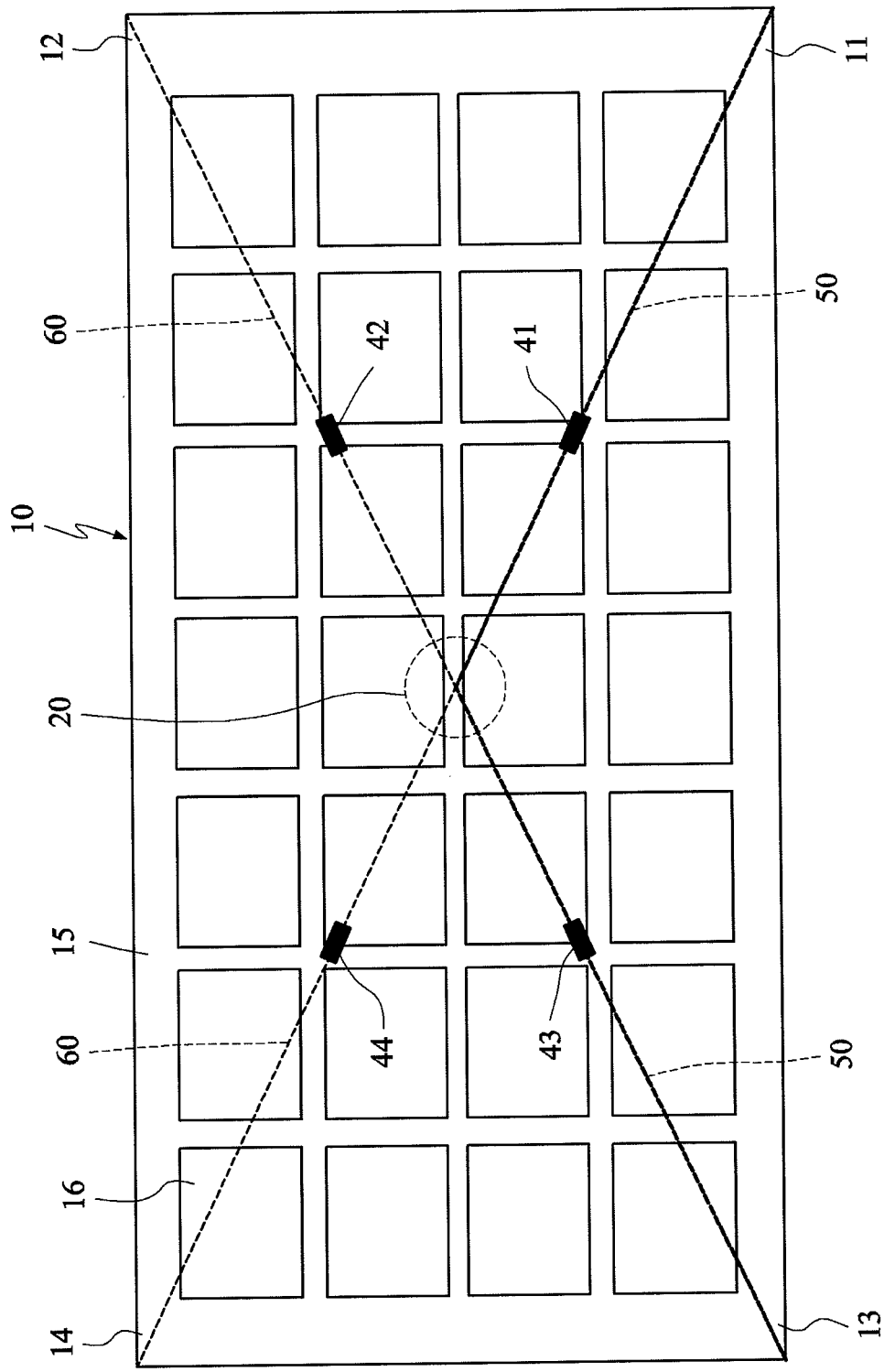

FIGS. 4 and 5 are top views showing two examples of the solar generator module 10 according to the preferred embodiment of the invention. Referring to FIGS. 4 and 5, the solar generator module 10 includes a frame 15 and multiple solar panels 16. The frame 15 is connected to the first cable 50, the second cable 60 and the middle column 20. The solar panels 16 are mounted on the frame 15 and arranged in an array, and are electrically connected together in parallel and/or in series. The difference between FIGS. 4 and 5 resides in that the positions of the first corner portion 11 and the second corner portion 12 are defined differently so that the first cable 50 and the second cable 60 of FIG. 5 have the paths different from those of FIG. 4.

Figure 6:
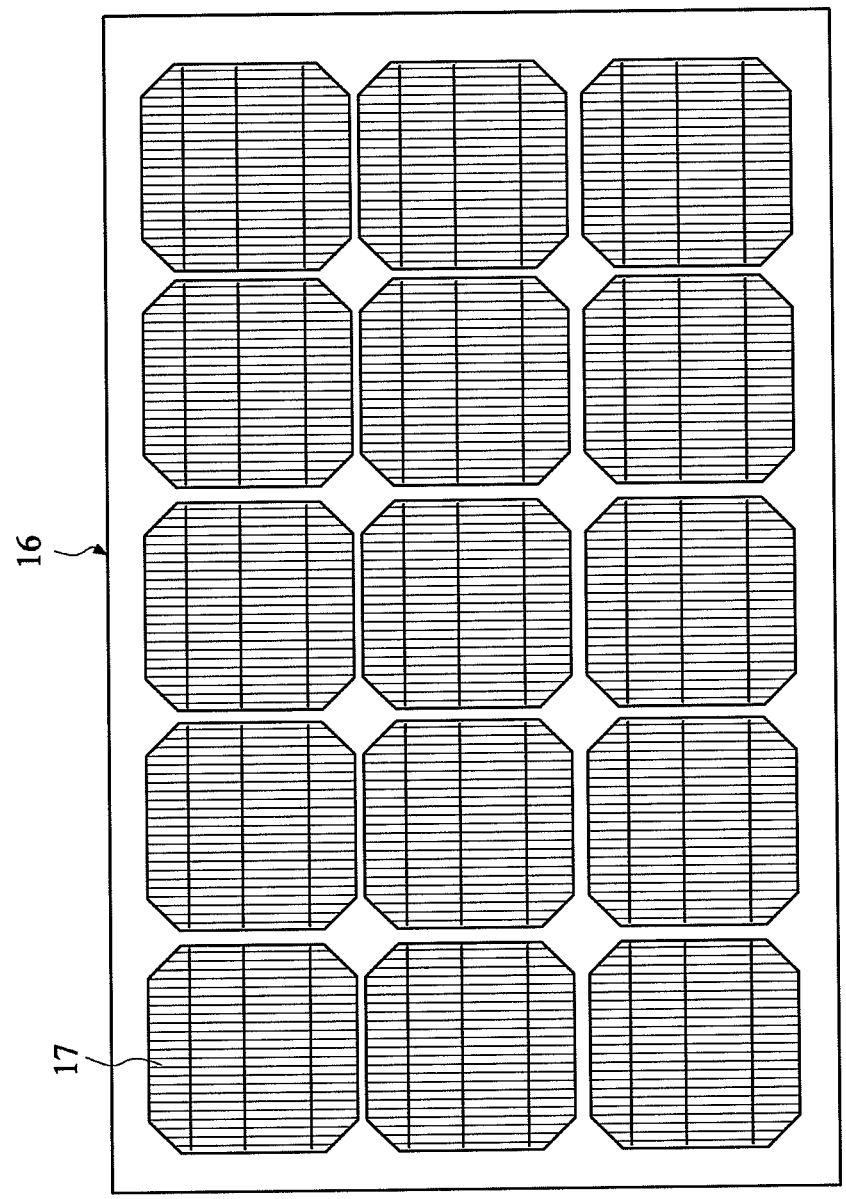
FIG. 6 is a top view showing a solar panel of the solar generator apparatus according to the preferred embodiment of the invention.

FIG. 6 is a top view showing the solar panel 16 of the solar generator apparatus 1 according to the preferred embodiment of the invention. As shown in FIG. 6, each solar panel 16 includes multiple solar cells 17 connected in parallel and/or in series. The solar cell 17 may be a single-crystal solar cell, a polycrystalline solar cell, a film solar cell or any other type of solar cell.

Figure 7:
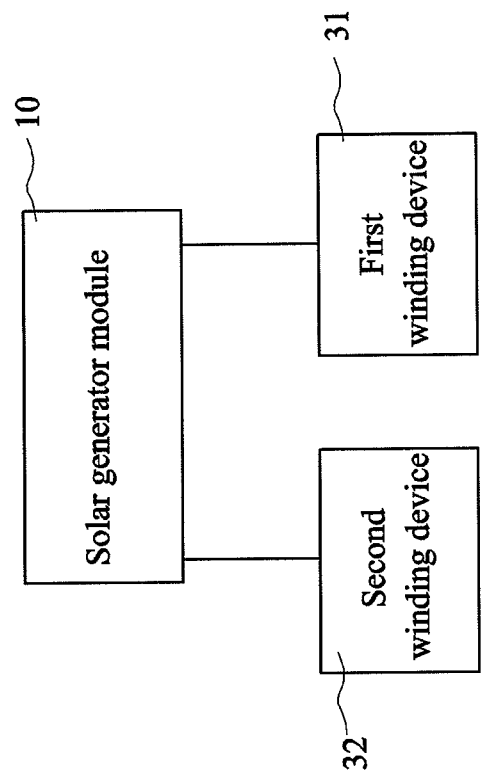
FIG. 7 is a block diagram showing connections between the solar generator module and the first and second winding devices according to the preferred embodiment of the invention.

FIG. 7 is a block diagram showing connections between the solar generator module 10 and the first and second winding devices 31, 32 according to each embodiment of the invention. As shown in FIG. 7, the first and second winding devices 31, 32 are electric winding devices powered by the solar generator module 10.

Accordingly, the solar generator apparatus with elastically cable-controlled tracking according to the invention can have the stable and elastic support and sun-tracking effects, is thus suitable for the large generator application, can be rotated and moved with multiple degrees of freedom to track the sun, and can be adapted to various applications to effectively enhance the received availability of the solar energy.

While the present invention has been described by way of examples and in terms of preferred embodiments, it is to be understood that the present invention is not limited thereto. To the contrary, it is intended to cover various modifications. Therefore, the scope of the appended claims should be accorded the broadest interpretation so as to encompass all such modifications.

What is claimed is:

1. A solar generator apparatus with elastically cable-controlled tracking, the solar generator apparatus being mounted on a fixed structure, the solar generator apparatus comprising:
   a solar generator module, which has first to fourth corner portions and converts light into electricity;
   a middle column, which has a first end mounted on the fixed structure and a second end pivotally connected to a middle portion of a bottom of the solar generator module, and rotatably supports the solar generator module;
   first and second winding devices attached to the middle column;
   a first cable, which has a first end connected to the first corner portion and a second end connected to the third corner portion, and is wound around the first winding device;
   a second cable, which has a first end connected to the second corner portion and a second end connected to the fourth corner portion, and is wound around the second winding device, wherein an angle of the solar generator module is adjusted by rotating one or both of the first winding device and the second winding device; and first to fourth elastic anchors, which are elastically mounted on the fixed structure and respectively correspond to the first to fourth corner portions, wherein the first cable passes through the first and third elastic anchors to form a W-shaped structure, and the second cable passes through the second and fourth elastic anchors to form another W-shaped structure.

2. The solar generator apparatus according to claim 1, wherein the solar generator module comprises:

a frame connected to the first cable, the second cable and the middle column; and a plurality of solar panels mounted on the frame, wherein each of the solar panels is composed of a plurality of solar cells connected together.

3. The solar generator apparatus according to claim 1, further comprising:

a plurality of buffer assemblies, which is retractably connecting the middle column to the solar generator module and assisting in supporting and buffering the solar generator module, to which an external force is applied.

4. The solar generator apparatus according to claim 1, wherein the second end of the middle column is pivotally connected to the middle portion of the bottom of the solar generator module through a universal joint.

5. The solar generator apparatus according to claim 1, wherein the middle column is retractable in length.

6. The solar generator apparatus according to claim 1, wherein the first and second winding devices are movably attached to the middle column, so that levels of the first and second winding devices are adjustable.

7. The solar generator apparatus according to claim 1, wherein the first and second winding devices are electric winding devices powered by the solar generator module.

8. The solar generator apparatus according to claim 1, wherein the first and second winding devices are accommodated within the middle column.

9. The solar generator apparatus according to claim 1, wherein the first and second winding devices are disposed on an outside of the middle column.

10. The solar generator apparatus according to claim 1, wherein each of the first to fourth elastic anchors comprises a spring.

* * * * *